United States Patent [19]

Ito

[11] Patent Number: 4,700,079

[45] Date of Patent: Oct. 13, 1987

[54] LIGHT-TRANSMISSION TYPE SMOKE DETECTOR HAVING A SPIRAL OPTICAL PATH

[75] Inventor: Shoji Ito, Tokyo, Japan

[73] Assignee: Nittan Company, Limited, Tokyo, Japan

[21] Appl. No.: 836,324

[22] Filed: Mar. 5, 1986

[30] Foreign Application Priority Data

Mar. 20, 1985 [JP] Japan ............................ 60-39020[U]

[51] Int. Cl.[4] ............................................ G01N 15/07

[52] U.S. Cl. .................................... 250/574; 356/438; 340/630

[58] Field of Search ................ 250/574, 573; 356/438, 356/439, 437; 340/630; 174/35 MS

[56] References Cited

U.S. PATENT DOCUMENTS

| | | | |
|---|---|---|---|
| 4,203,100 | 5/1980 | Yamauchi et al. | 340/630 |
| 4,383,253 | 5/1983 | Lam et al. | 340/629 |
| 4,386,388 | 5/1983 | Beun | 175/35 MS |
| 4,547,673 | 10/1985 | Larsen et al. | 250/573 |
| 4,626,695 | 12/1986 | Keeler | 250/574 |

*Primary Examiner*—Edward P. Westin
*Assistant Examiner*—Jessica L. Ruoff
*Attorney, Agent, or Firm*—Webb, Burden, Robinson & Webb

[57] ABSTRACT

In a light-transmission type smoke detector, a smoke chamber is composed of a disc-like block of a non-conductive material one side of which has a spiral groove and is coated with a conductive bright metal film and a casing mounted on the block, said casing having a plurality of labyrinth structure smoke entrances. An electric circuit system is placed on the other side of the disc-like block and is covered by a shield sheet. The shield sheet and the coating metal film are electrically connected to shield the electric circuit system.

5 Claims, 2 Drawing Figures

LIGHT-TRANSMISSION TYPE SMOKE DETECTOR HAVING A SPIRAL OPTICAL PATH

FIELD OF THE INVENTION

This invention relates to a light-transmission type smoke detector which detects a fire by sensing with a light-receiving element the dimming of a light beam emitted from a light-emitting element caused by the smoke generated by the fire.

BACKGROUND OF THE INVENTION

The light-transmission type smoke detector is well known. Detectors of this type require a rather long optical path to attain sufficient dimming of a light beam. In Japanese Laid-Open Utility Model Publication No. 61-10549, filed June 25, 1984 and published Jan. 22, 1986, is described a light-transmission type smoke detector having an optical path comprising a spiral tube formed in a disc-like block of a plastic material, the inside surface of which constitutes a mirror and which is provided with a plurality of small through holes, through which smoke may enter the tube. This detector has advantages and disadvantages. It is advantageous in that it has low susceptibility to electrical noise since its light-emitting and light-receiving elements are shielded by the metal film coating provided on the inside surface of the optical path to constitute a mirror. It is disadvantageous in that smoke does not easily enter the optical path through the small through holes.

DISCLOSURE OF THE INVENTION

This invention provides a light-transmission type smoke detector comprising a disc-like block of a non-electroconductive material on the underside of which a spiral groove is provided to form an optical path, at one end of which a light-emitting element is provided and at the other end of which a light-receiving element is provided, the upperside of said block providing a space in which a smoke-detecting electric circuit system is received; a casing mounted on the block to form a smoke chamber together with said groove, said casing being provided with a plurality of smoke entrances of a labyrinth structure; and a base plate for supporting the block and the casing and on a ceiling or wall; wherein the underside surface of the block including the groove is coated with a bright electroconductive metal film, an electroconductive shield sheet is provided inside the base plate and the metal film and the shield sheet are electrically connected.

Theoretically, the block member may be made of any non-conductive material including wood, but the most practical material is a thermoplastic resin. The casing can be made of a metal or a plastic. The conductive metal film on the underside surface of the block is preferably of nickel, applied by electroplating or vacuum-deposition.

The electric circuit system placed in the space formed by the block member and the base plate is known per se and can be any system which can compare the output of the light-receiving element with a reference and cause an alarm to be generated when the output exceeds the reference.

The electrical connection between the electroconductive coating and the shield member may be a wall or a net surrounding the block member or simply a lead wire.

Since the smoke chamber comprises a casing member provided with a plurality of labyrinth-structure smoke entrances, smoke can freely enter the optical path. Since the continuous electroconductive film coating the underside surface of the block member is utilized as a part of the shield means and is connected with a separately provided shield sheet, the electric circuit system is well shielded, and is thus less susceptible to electrical noise. That is to say, the advantage of the prior art is retained and improved, and the disadvantage of the prior art is overcome.

Now the invention will be specifically described with reference to the attached drawings.

DETAILED DESCRIPTION OF THE INVENTION

Figure 1:
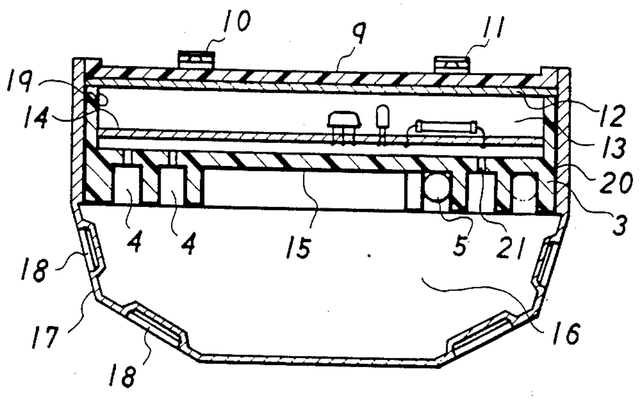
FIG. 1 is an elevational cross-sectional view of an embodiment of the light-transmission type smoke detector of the present invention.
Figure 2:
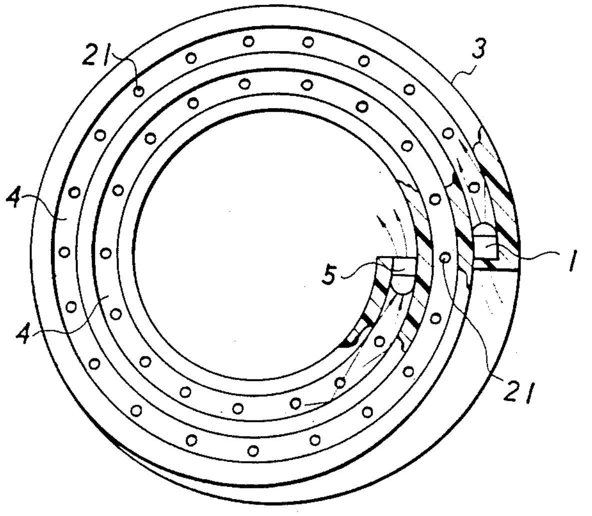
FIG. 2 is a partly cross-sectional bottom view of the block member including a light-emitting element and a light-receiving element.

As shown in FIG. 1 and FIG. 2, the block 3 is a generally disc-like member, on the underside of which is provided a spiral groove 4. The periphery of the disc-like block upwardly extends to form an upright wall or skirt 19. The opening defined by the upper periphery of the skirt 19 is covered by a base plate 9 provided on its upperside with terminals 10, 11 destined to be received in sockets provided on a wall or a ceiling to secure the smoke detector thereon. A shield sheet 12 is provided on the underside of the base plate.

The base plate 9 bearing the shield sheet 12 is combined with the block 3 to form a space 13 for an electric circuit system. The electric circuit system, which comprises various electrical elements and devices mounted on a printed circuit board 14, for instance, is accommodated in the space 13.

The whole underside surface of the block 3 including the groove 4 is coated with a bright metal film 15, by electroplating or vacuum-deposition. At one end of the groove 4 is provided a light-emitting element 1 and at the other end a light-receiving element 5. The groove 4 constitutes a light path. Needless to say, these elements are electrically connected to the electric circuit system in an appropriate manner.

The conductive coating film 15 and the shield sheet 12 are electrically connected. The connecting means may be a metal wall or metal net 20 surrounding the upright wall or skirt 19 of the block 3, or it may be merely a lead wire connecting the conductive coating film 15 and the shield sheet 12.

A casing 17 which comprises a cylindrical wall and a dome-like part is secured to the block 3 so as to form a smoke chamber 16 between itself and the block 3. The dome is provided with a plurality of labyrinth-structure smoke entrances 18, which permit smoke to freely enter the smoke chamber 16, but prevent entry of light.

A plurality of through holes 21 may be provided at the bottom of the groove 4 as shown in FIGS. 1 and 2 so that smoke can more easily enter the smoke chamber 16, especially the optical path.

The cross section of the optical path groove is preferably rectangular as illustrated in the drawings, but it may be of any shape which does not impair reflection of a light beam.

The light-transmission type smoke detector of this invention works as follows.

A light beam from the light-emitting element 1 is repeatedly reflected by the wall (mirror) of the optical path groove 4 and reaches the light-receiving element 5. In the course of its travel, the light beam is dimmed by any smoke that has entered the smoke chamber 16 and the groove 4. Thus the output of the light-receiving element 5 changes. When the degree of dimming exceeds a predetermined value, a fire alarm signal is generated.

As the electric circuit system is shielded by the shield sheet and the conductive coating film, the system is well protected against electrical noise.

Thus this invention provides a compact light-transmission type smoke detector with improved accuracy.

I claim:

1. A light-transmission type smoke detector comprising a disc-like block of a non-electroconductive material on the underside of which a spiral groove is provided to form an optical path, at one end of which a light-emitting element is provided and at the other end of which a light-receiving element is provided; a casing mounted on the block to form a smoke chamber together with said groove, said casing being provided with a plurality of smoke entrances of a labyrinth structure; and a base plate for supporting the block and the casing on a ceiling or wall, said base plate spaced above an upperside of said block and forming a space in which a smoke-detecting electric circuit system is received; wherein the underside surface of the block including the groove is coated with a bright electroconductive metal film, an electroconductive shield sheet is provided inside the base plate and the metal film and the shield sheet are electrically connected.

2. The light-transmission type smoke detector recited in claim 1, wherein the underside of the block is coated with nickel.

3. The light-transmission type smoke detector recited in claim 1, wherein the shield sheet and the coating film are electrically connected by a surrounding wall of a conductive material.

4. The light-transmission type smoke detector recited in claim 1, wherein the shield sheet and the coating film are electrically connected by a surrounding wall of a conductive material net.

5. The light-transmission type smoke detector recited in claim 1, wherein the shield sheet and the coating film are electrically connected by at least one lead wire.

* * * * *